(12) United States Patent
Berger et al.

(10) Patent No.: US 11,982,396 B2
(45) Date of Patent: *May 14, 2024

(54) THERMOPLASTIC COMPOSITE PIPE WITH MULTILAYER INTERMEDIATE LAMINA

(71) Applicant: Evonik Operations GmbH, Essen (DE)

(72) Inventors: Jasmin Berger, Dortmund (DE); Hans Ries, Marl (DE); Juergen Franosch, Marl (DE); Rainer Goering, Borken (DE); Horst Beyer, Marl (DE)

(73) Assignee: Evonik Operations GmbH, Essen (DE)

( * ) Notice: Subject to any disclaimer, the term of this patent is extended or adjusted under 35 U.S.C. 154(b) by 1 day.

This patent is subject to a terminal disclaimer.

(21) Appl. No.: 17/476,907

(22) Filed: Sep. 16, 2021

(65) Prior Publication Data

US 2022/0003338 A1 Jan. 6, 2022

Related U.S. Application Data

(63) Continuation of application No. 15/866,166, filed on Jan. 9, 2018, now Pat. No. 11,149,879.

(30) Foreign Application Priority Data

Jan. 10, 2017 (EP) .................................... 17150841

(51) Int. Cl.
*F16L 9/12* (2006.01)
*B29C 63/06* (2006.01)
(Continued)

(52) U.S. Cl.
CPC ................ *F16L 9/12* (2013.01); *B29C 63/06* (2013.01); *B29C 66/5324* (2013.01);
(Continued)

(58) Field of Classification Search
CPC ........................................................ F16L 9/12
See application file for complete search history.

(56) References Cited

U.S. PATENT DOCUMENTS

| 4,883,625 | A | 11/1989 | Glemet et al. |
| 5,002,712 | A | 3/1991 | Goldmann et al. |

(Continued)

FOREIGN PATENT DOCUMENTS

| CN | 1212041 A | 3/1999 |
| CN | 104421537 A | 3/2015 |

(Continued)

OTHER PUBLICATIONS

European Search Report dated Jul. 24, 2017 in Patent Application No. 17150841.9 (with English translation of categories of cited documents), 6 pages.

(Continued)

*Primary Examiner* — Jeffry H Aftergut
(74) *Attorney, Agent, or Firm* — Oblon, McClelland, Maier & Neustadt, L.L.P.

(57) ABSTRACT

A process for producing a thermoplastic composite pipe, where the process includes:
  a) providing a tubular liner having a wall containing a thermoplastic polymer A in the region of the outer surface;
  b) providing a tape containing reinforcing fibres in a matrix containing a thermoplastic polymer B, where polymer A and polymer B are different;
  c) applying a film or a composite which is produced in d) and is composed of a film and a tape provided in step b) to the tubular liner, with melting of the outer surface of the liner and of the contact surface of the film either beforehand, simultaneously or thereafter,
  d) applying the tape provided in b) to the outer surface of the film, with melting of the outer surface of the film (Continued)

applied and of the contact surface of the tape either beforehand, simultaneously or thereafter, where the surface of the film which is brought into contact with the liner contains a moulding compound containing polymer A to an extent of at least 30% by weight, and the opposite surface of the film contains a moulding compound containing polymer B to an extent of at least 30% by weight.

16 Claims, 2 Drawing Sheets

(51) Int. Cl.
| | |
|---|---|
| B29C 65/00 | (2006.01) |
| B29C 70/02 | (2006.01) |
| B29C 70/32 | (2006.01) |
| B29D 23/00 | (2006.01) |
| B32B 1/08 | (2006.01) |
| B32B 27/08 | (2006.01) |
| B32B 27/18 | (2006.01) |
| B32B 37/06 | (2006.01) |
| C08J 5/04 | (2006.01) |
| C08L 101/12 | (2006.01) |
| F16L 9/128 | (2006.01) |
| F16L 11/08 | (2006.01) |
| F16L 11/16 | (2006.01) |
| B29C 63/10 | (2006.01) |
| B29C 65/02 | (2006.01) |
| B29C 65/10 | (2006.01) |
| B29C 65/14 | (2006.01) |
| B29C 65/16 | (2006.01) |
| B29C 65/18 | (2006.01) |
| B29C 65/50 | (2006.01) |
| B29K 101/10 | (2006.01) |
| B29K 105/08 | (2006.01) |
| B29L 23/00 | (2006.01) |
| F16L 11/04 | (2006.01) |

(52) U.S. Cl.
CPC ............ *B29C 70/026* (2013.01); *B29C 70/32* (2013.01); *B29D 23/001* (2013.01); *B32B 1/08* (2013.01); *B32B 27/08* (2013.01); *B32B 27/18* (2013.01); *B32B 37/06* (2013.01); *C08J 5/04* (2013.01); *C08L 101/12* (2013.01); *F16L 9/128* (2013.01); *F16L 11/08* (2013.01); *F16L 11/16* (2013.01); *B29C 63/10* (2013.01); *B29C 65/02* (2013.01); *B29C 65/10* (2013.01); *B29C 65/1412* (2013.01); *B29C 65/1425* (2013.01); *B29C 65/16* (2013.01); *B29C 65/18* (2013.01); *B29C 65/5021* (2013.01); *B29C 65/5057* (2013.01); *B29C 66/1122* (2013.01); *B29C 66/5326* (2013.01); *B29C 66/71* (2013.01); *B29C 66/712* (2013.01); *B29C 66/721* (2013.01); *B29C 66/73921* (2013.01); *B29K 2101/10* (2013.01); *B29K 2105/08* (2013.01); *B29L 2023/22* (2013.01); *B32B 2305/08* (2013.01); *B32B 2398/20* (2013.01); *B32B 2597/00* (2013.01); *C08J 2300/22* (2013.01); *C08L 2203/18* (2013.01); *F16L 11/04* (2013.01)

(56) References Cited

U.S. PATENT DOCUMENTS

| | | | |
|---|---|---|---|
| 5,500,263 | A | 3/1996 | Röber et al. |
| 5,554,426 | A | 9/1996 | Röber et al. |
| 5,799,704 | A | 9/1998 | Andre |
| 6,085,799 | A | 7/2000 | Kodaissi et al. |
| 6,123,114 | A | 9/2000 | Seguin et al. |
| 10,816,113 | B2 | 10/2020 | Berger et al. |
| 11,149,879 | B2 * | 10/2021 | Berger .............. B32B 5/024 |
| 2002/0094400 | A1 * | 7/2002 | Lindstrom .......... B29C 48/33 |
| | | | 428/36.3 |

FOREIGN PATENT DOCUMENTS

| | | |
|---|---|---|
| CN | 105061882 A | 11/2015 |
| EP | 0 056 703 A1 | 7/1982 |
| EP | 0 364 829 A2 | 4/1990 |
| EP | 0 618 390 A1 | 10/1994 |
| EP | 0 685 674 A1 | 5/1995 |
| EP | 0 673 762 A2 | 9/1995 |
| JP | H05-508466 | 11/1993 |
| JP | H06-340034 | 12/1994 |
| JP | 2004-44799 A * | 2/2004 |
| WO | WO 95/07428 A1 | 3/1995 |
| WO | WO-95/07428 A1 * | 6/1995 |
| WO | WO 99/67581 A1 | 12/1999 |
| WO | WO 01/61232 A1 | 8/2001 |
| WO | WO 02/095281 A1 | 11/2002 |
| WO | WO 2006/107196 A1 | 10/2006 |
| WO | WO 2012/118378 A1 | 9/2012 |
| WO | WO 2012/118379 A1 | 9/2012 |
| WO | WO 2012/149129 A1 | 11/2012 |
| WO | WO 2013/188844 A1 | 12/2013 |
| WO | WO 2014/140025 A1 | 9/2014 |

OTHER PUBLICATIONS

J.L.C.G. de Kanter, et al., "Thermoplastic Composite Pipe: Analysis and Testing of a Novel Pipe System for Oil & Gas" ICCM 17 conference in Edinburgh, 2009, 10 Pages.

* cited by examiner

THERMOPLASTIC COMPOSITE PIPE WITH MULTILAYER INTERMEDIATE LAMINA

CROSS REFERENCE TO RELATED APPLICATIONS

This application is a continuation of U.S. application Ser. No. 15/866,166, fled on Jan. 9, 2018, which claims foreign priority to European Patent Application EP 17150841, filed on Jan. 10, 2017, the entire contents of which are incorporated herein by reference.

The invention provides a flexible fibre-reinforced composite pipe comprising an inner liner (also called "liner" for short hereinafter), one or more tape laminas, and a single- or multi-layer intermediate lamina which is arranged between the inner liner and tape lamina and bonds them, and a process for production thereof. The material of the inner liner, the matrix of the tape laminas and the polymers of the intermediate lamina are thermoplastic. The composite pipe according to the invention is used for of and gas production, especially for the offshore production of oil or gas, as a riser, as an umbilical, for the transport of the produced oil or gas across the seabed from the well to the riser, or for transport on land.

In the prior art, what are called unbonded flexible pipes are very frequently used for this application sector. Pipes of this kind comprise an inner lining, typically in the form of a plastic pipe, as a barrier to the exit of the fluid being conveyed, and also one or more armour layers on the outside of this inner lining. The unbonded flexible pipe may comprise additional layers, for example one or more armour layers on the inside of the inner lining, in order to prevent the collapse of the inner lining under high external pressure. Such an inner armour is typically referred to as carcass. In addition, an outer shell may be present in order to provide a barrier against the ingress of liquid from the outside environment into the armour layers or polymeric or metallic functional layers further to the inside, and as protection against outside mechanical stresses.

Typical unbonded flexible pipes are described by way of example in WO 01/61232, U.S. Pat. Nos. 6,123,114 and 6,085,799; they are moreover described in more detail in API Recommended Practice 17B, "Recommended Practice for Flexible Pipe", 3rd edition, March 2002, and also in API Specification 17J. "Specification for Unbonded Flexible Pipe", 2nd Edition, November 1999.

The term "unbonded" in this context means that at least two of the layers, inclusive of reinforcing layers and plastics layers, do not have any mutual adhesive bonding. In practice, the pipe comprises at least three armour layers which, over the entire length of the pipe, have no mutual 35 bonding either directly or indirectly, i.e. by way of other layers. This renders the pipe flexible to an extent that allows it to be rolled up for transport purposes.

In conventional unbonded flexible pipes, the armour layer(s) usually consist(s) of steel wires, steel profiles or steel strips arranged in the form of a spiral, where the individual layers may be formed with different winding angles relative to the pipe axis (tensile armour), and pressure armour wound primarily in the circumferential direction. In such unbonded flexible pipes, the steel component is exposed to the corrosive effects of the medium being conveyed. Owing to the resulting choice of material and the complex construction, pipes of this kind are comparatively costly. The high intrinsic weight is very disadvantageous especially in the case of relatively long risers for offshore oil production in deep seas.

For some time, there have been descriptions of developments where thermoplastic composite pipes are employed. These are pipes having, as inner lamina, a single- or multilayer inner liner (composed of thermoplastic material. A composite lamina is applied thereto, in a cohesively bonded or in some cases even unbonded manner, for example by winding of unidirectionally fibre-reinforced tapes. Composite pipes of this kind are described, for example, in WO 95/07428 and WO 99/67561. The production thereof is additionally described in WO 02/095281, WO 2006/107196, WO 20121118378, WO 2012/118379 and WO 2013/188644.

It is a general problem in the case of these composite pipes that the bonding between a fibre-rich tape lamina and the adjoining surface in the case of a suboptimal material combination is inadequate to withstand the stresses in installation and operation, especially in offshore applications, such as attachments to fittings or mounting with gripping devices, and the hard test conditions to which constructions of this kind are subjected. Mention is made here by way of example of the detachment of layers in the rapid gas compression test or under the action of significant bending forces. Attempts are therefore being made in the prior art preferably to use polymer of the same kind for the tape matrix and an adjoining surface, for example the outer surface of the inner liner (see, for instance, Thermoplastic Composite Pipe: An Analysis And Testing Of A Novel Pipe System For Oil & Gas; presentation by J.L.C.G. de Kanter and J. Leijten at the ICCM 17 conference in Edinburgh, UK. 2009).

In the case of thermoplastic composite pipes with single-wall liners, liner pipes made of polyethylene are used in the low-temperature range (sustained temperature up to about 50° C.), and liner pipes made of polyamide such as PA11 or PA12 at higher temperatures up to about 80° C. At even higher temperatures, high-cost materials such as polyvinylidene difluoride (PVDF) or even polyether ether ketone (PEEK) are used. Taking account of the demands on chemical stability, ageing resistance and thermal stability, it is possible in many cases to use composites comprising a matrix composed of PA11 or PA12. However, a question that generally arises in the case of combination of unlike materials is how the necessary adhesion is to be achieved between the tape lamina and liner, or tape lamina and outer shell.

Recently, particularly in the case of unbonded flexible pipes, there have been published developments where the inner liner no longer consists of a single-wall pipe, but consists of a multilayer pipe with generally two or three layers. Multilayer plastic pipes of this kind have been known for many years from the field of fuel pipes for motor vehicles. However, the extrusion systems available for the purpose are designed for pipes having small diameters, i.e. for diameters of much less than 50 mm and generally for diameters of 6 to 12 mm. For applications in the oil and gas sector, however, much greater diameters are required—according to the application, customary internal diameters are from 1 to 10 inches (25.4 to 254 mm). However, systems that can produce these diameters are usually available only for the production of single-layer pipes. Retrofitting of existing multilayer systems for high diameters or retrofitting of existing monolayer pipe systems for multilayer large pipes is associated with high time demands and costs, and in some cases is barely possible owing to the space required. Furthermore, the desired polymer combinations of liner surface and tape matrix with a two- or three-layer liner are not even achievable at all in many cases.

The person skilled in the art is aware that the composite can be formed from two different thermoplastic layers with one another either via material compatibility or via chemical reactions. Material compatibility exists in the ideal case when the same polymer is involved. It is known from experience with multilayer pipe development and multicomponent injection moulding that chemical bonds can be achieved quite efficiently with elevated temperature and residence time when melt is applied to melt, for example in coextrusion. However, good adhesion of the identical material combination is much more difficult to achieve when a solidified surface first has to be surface-melted by a hot melt and only little time is available for a chemical reaction. Even in the case of polymers of the same kind, a bond thus established can have inadequate strength. A better composite arises when the two composite partners are melted at the surface thereof prior to joining and then pressed against one another. However, here too, the time for a chemical reaction is short, and so the bonds between equivalent polymers generally have better adhesion than bonds that have to be implemented through a chemical reaction or via material compatibility (i.e. through diffusion processes).

The problem addressed by the invention is that of providing a process for producing a thermoplastic composite pipe with which, firstly, high degrees of freedom are achieved in the material combination of liner and tape matrix, and which secondly gives very good adhesion at the critical layer boundaries.

The underlying problem is solved in that the tape and liner are bonded to one another so as to produce a film, one surface of which comprises the polymer A of the liner surface and the other surface of which comprises the polymer B of the tape matrix. The film is then bonded to the liner with application of heat and, in a further step, bonded to the first tape lamina with application of heat.

Figure 1:
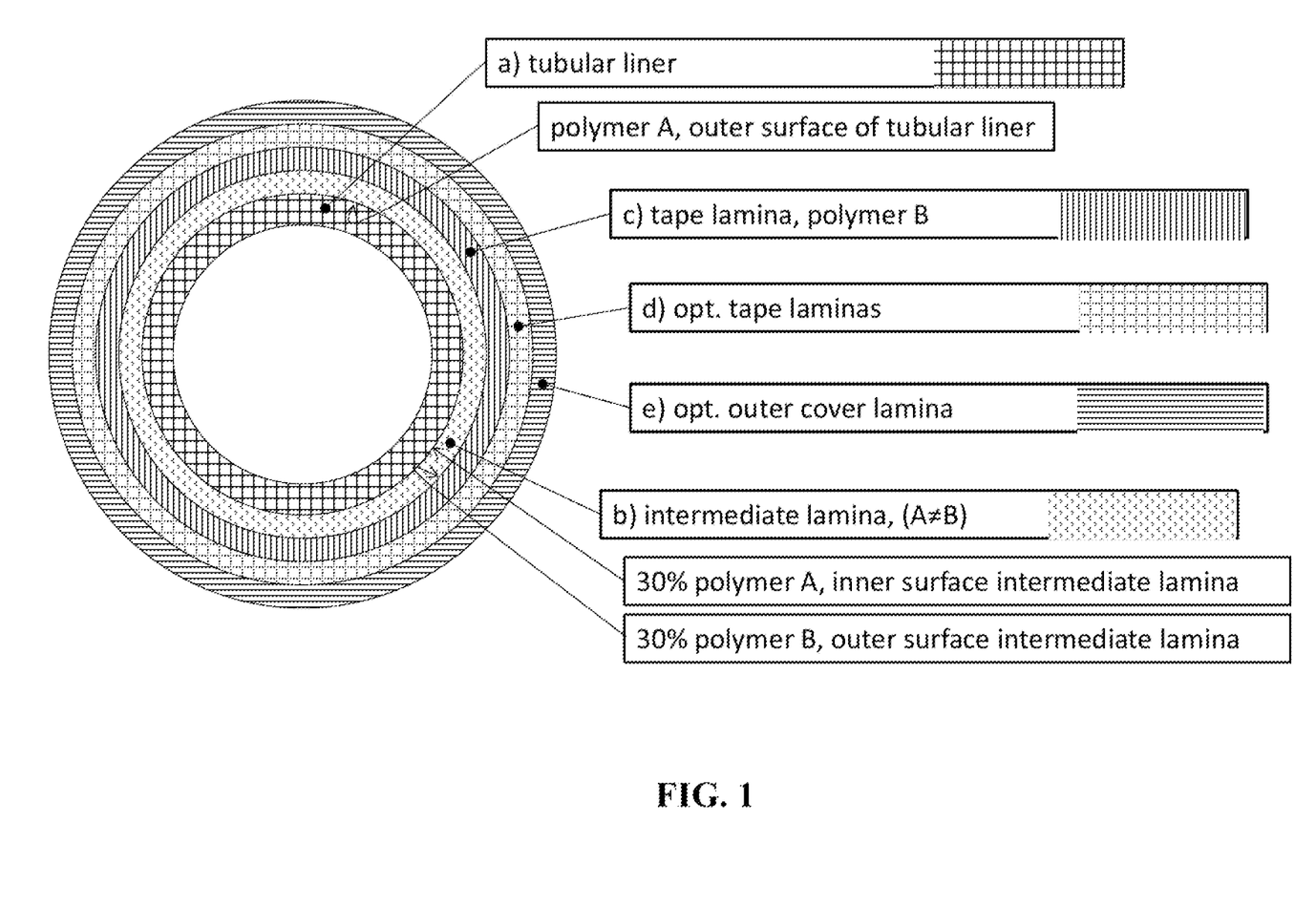
FIG. 1 provides a representation of one embodiment of the thermoplastic composite pipe of the present application.
Figure 2:
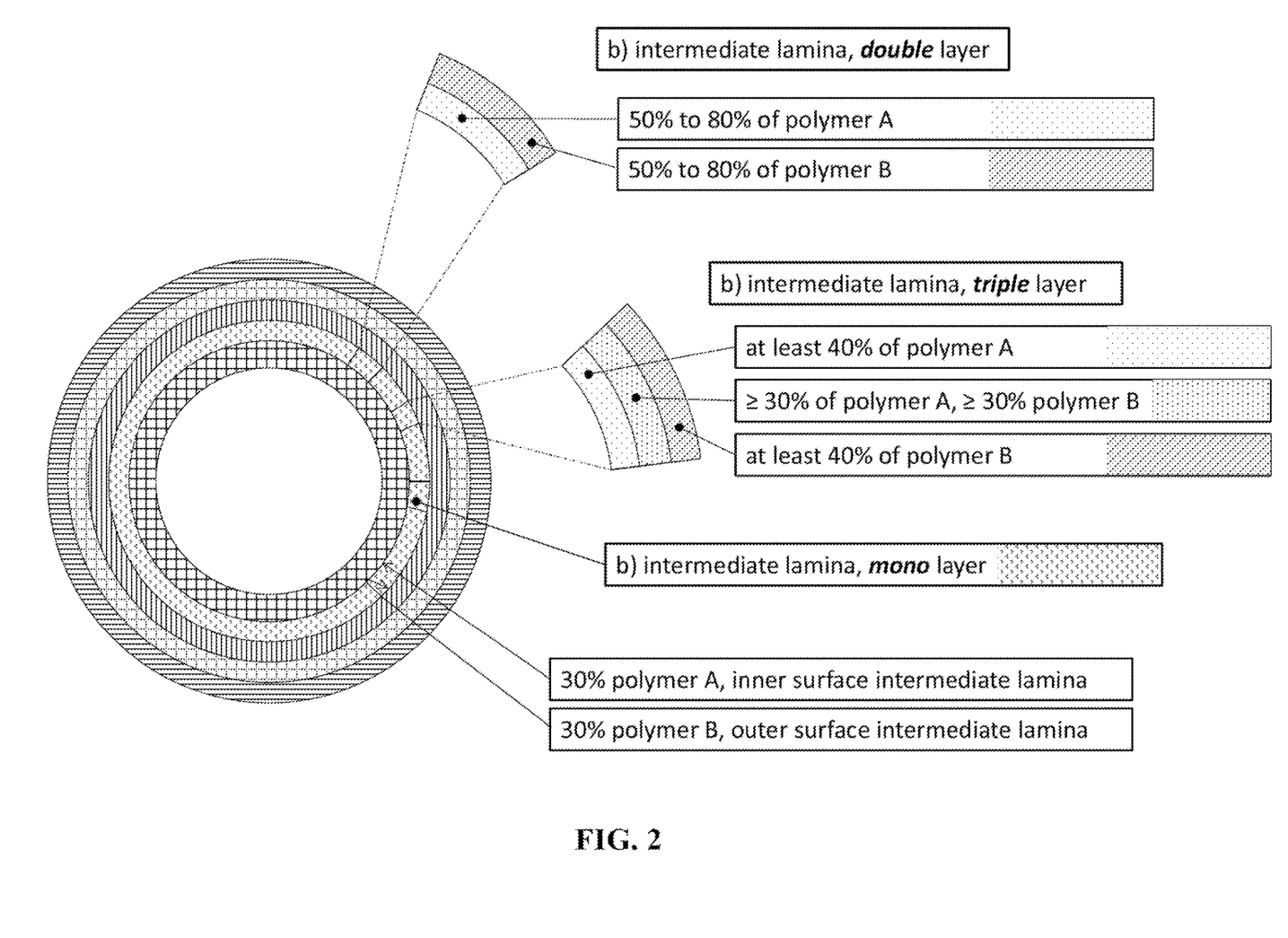
FIG. 2 provides representations of other embodiments of the thermoplastic composite pipe of the present application, where the intermediate lamina is a (i) mono layer, (ii) a double layer, or a (iii) a triple layer.

The invention thus provides a process for producing a thermoplastic composite pipe, comprising the following steps:
a) providing a tubular liner having a wall comprising a thermoplastic polymer A in the region of the outer surface;
b) providing a tape comprising reinforcing fibres in a matrix comprising a thermoplastic polymer B (also called "reinforcement tape" hereinafter);
where polymer A and polymer B are different;
c) applying a film or a composite which is produced in step d) and is composed of a film and a tape provided in step b) to the tubular liner, with melting of the outer surface of the liner and of the contact surface of the film either beforehand, simultaneously or thereafter, where the region of the contact surface of the film consists of a moulding compound comprising polymer A to an extent of at least 30% by weight, preferably to an extent of at least 40% by weight, more preferably to an extent of at least 50% by weight, especially preferably to an extent of at least 60% by weight and most preferably to an extent of at least 70% by weight, and where the region of the opposite surface of the film consists of a moulding compound comprising polymer B to an extent of at least 30% by weight, preferably to an extent of at least 40% by weight, more preferably to an extent of at least 50% by weight especially preferably to an extent of at least 60% by weight and most preferably to an extent of at least 70% by weight;
d) applying the tape provided in step b) to the outer surface of the film, with melting of the outer surface of the film applied and of the contact surface of the tape either beforehand, simultaneously or thereafter;
e) optionally applying further tape laminas comprising reinforcing fibres in a matrix in a cohesively bonded manner to the tape lamina applied,
f) optionally finally applying an outer cover lamina composed of a polymeric material.

The invention is to be elucidated in detail hereinafter.

The tubular liner generally has an internal diameter in the range from 15 to 400 mm, preferably in the range from 20 to 300 mm and more preferably in the range from 25 to 255 mm. Its wall thickness is generally in the range from 2 to 40 mm, preferably in the range from 2.5 to 30 mm and more preferably in the range from 3 to 20 mm. The liner may have a single layer or multiple layers. If it has a single layer, it consists of a moulding compound comprising at least 30% by weight, preferably at least 40% by weight, more preferably at least 50% by weight, even more preferably at least 60% by weight and especially preferably at least 70% by weight, at least 80% by weight or at least 85% by weight of the polymer A, based in each case on the overall moulding compound. If the liner has multiple layers, the outer layer consists of this moulding compound; the inner layer may consist of a moulding compound having, for example, a barrier effect or a chemical protection function with respect to components of the medium to be conveyed. Inner and outer layers may be bonded to one another by an adhesion promoter layer.

The polymer A may, for example, be a polyolefin, a polyamide, a polyphthalamide (PPA), a polyethylene naphthalate, a polybutylene naphthalate, a fluoropolymer, a polyphenylene sulphide (PPS), a polyether sulphone, a polyphenyl sulphone (PPSU) or a polyarylene ether ketone such as PEEK or PEK. In a preferred embodiment, the moulding compound of the single-layer liner or the moulding compound of the outer layer of a multilayer liner does not comprise any further polymer aside from the polymer A.

The tape provided in step b) comprises reinforcing fibres. These may, for example, be glass fibres, carbon fibres, aramid fibres, boron fibres, ceramic fibres (for example composed of $Al_2O_3$ or $SiO_2$) basalt fibres, silicon carbide fibres, polyamide fibres, polyester fibres, fibres of liquid-crystalline polyester, polyacrylonitrile fibres, and fibres of polyimide, polyether imide, polyphenylene sulphide, polyether ketone or polyether ether ketone. The cross section of the fibres may for example be circular, rectangular, oval, elliptical, or cocoon-shaped. With fibres of cross section deviating from the circular shape (for example flat glass fibres) it is possible to achieve a higher fill level of fibre in the finished part, and thus higher strength. The fibres may be used in the form of short fibres or long fibres, or preferably in the form of endless fibres, for instance in the form of a weave or more preferably in the form of a unidirectional fibre lamina.

The proportion by volume of the reinforcing fibres in the tape is generally 10% to 85%, preferably 15% to 80%, more preferably 20% to 75% and especially preferably 25% to 70%.

The matrix of this tape consists of a moulding compound comprising at least 30% by weight, preferably at least 40% by weight, more preferably at least 50% by weight, even more preferably at least 60% by weight and especially preferably at least 70% by weight, at least 80% by weight or at least 85% by weight of the polymer B, based in each case on the overall moulding compound. The polymer B may, for example, be a polyolefin, a polyamide, a polyphthalamide (PPA), a polyethylene naphthalate, a polybutylene naphthalate, a fluoropolymer, a polyphenylene sulphide (PPS), a polyether sulphone, a polyphenyl sulphone (PPSU) or a polyarylene ether ketone such as PEEK or PEK. Polymer A and polymer B are different. This means that they are different in terms of chemical composition; differences in molecular weight, in the degree of branching or in the end groups are immaterial.

The tape can be produced by any prior art method. The production of unidirectional endless fibre-reinforced tapes is described in detail, for example, in EP 0 056 703 A1, EP 0 364 829 A2, U.S. Pat. No. 4,883,625, WO 2012/149129, WO 2013/188644 and WO 2014/140025. Possible production methods are, for example, melt application, impregnation with a polymer solution and removal of the solvent, film impregnation or powder impregnation.

Typically, the tape used has a width of 5 to 500 mm and preferably a width of 8 to 200 mm, while the thickness is typically in the range from 0.1 to 1 mm, preferably in the range from 0.1 to 0.5 mm and more preferably in the range from 0.15 to 0.35 mm. The overall composite lamina, i.e. the sum total of all the tape laminas, here is in the range from 1 to 100 mm, preferably in the range from 5 to 90 mm and more preferably in the range from 10 to 80 mm. For different tape laminas, it is possible to use different tape geometries. The tapes used may have any suitable cross section.

The polymers mentioned by way of example for polymer A and polymer B are well known to those skilled in the art and are commercially available in a multitude of commercial grades, and therefore there is no need for any more specific description. Examples of useful polyolefins include polypropylene, polyethylene and crosslinked polyethylene. Suitable polyamides are, for example, PA6, PA6, PA610, PA88, PA8, PA612, PA810, PA108, PA9, PA613, PA614, PA812, PA128, PA1010, PA10, PA814, PA148, PA1012, PA11, PA1014, PA1212 and PA12, or a polyether amide or polyether ester amide based on one of these polyamides. The polyphthalamide may, for example, be PA66/6T, PA6/6MT, PA6T/MPMDT (MPMD stands for 2-methylpentamethylenediamine), PA9T, PA10T, PA11T, PA12T, PA14T, PA6T/6I, PA8T/10T, PA8T/12, PA10T/11, PA10T/12 or PA612/6T. Suitable fluoropolymers are, for example, polyvinylidene fluoride (PVDF) ethylene-tetrafluoroethylene copolymer (ETFE), an ETFE modified with the aid of a tertiary component, for example propene, hexafluoropropene, vinyl fluoride or vinylidene fluoride (for example EFEP), ethylene-chlorotrifluoroethylene copolymer (E-CTFE), polychlorotrifluoroethylene (PCTFE), chloroalkyl vinyl ether-tetrafluoroethylene copolymer (CPT), tetrafluoroethylene-hexafluoropropene-vinylidene fluoride copolymer (THV), tetrafluoroethylene-hexafluoropropene copolymer (FEP) or tetrafluoroethylene-perfluoroalkyl vinyl ether copolymer (PFA). Also useful here are copolymers based on vinylidene fluoride that include up to 40% by weight of other monomers, for example trifluoroethylene, chlorotrifluoroethylene, ethylene, propene and hexafluoropropene.

The moulding compounds used in accordance with the invention may, as well as polymer A or polymer B, optionally comprise further polymers and customary auxiliaries or additives. In a preferred embodiment, the moulding compound for the liner does not comprise any further polymers aside from polymer A. In a further preferred embodiment, the moulding compounds both of the liner and of the reinforcing tapes do not comprise any further polymers aside from polymer A or polymer B.

The film applied in step c) is a single-layer film in a first embodiment, and a multilayer film in a second embodiment.

In the first embodiment, the thermoplastic component of the film consists of a moulding compound comprising at least 30% by weight, preferably at least 35% by weight and more preferably at least 40% by weight of polymer A, and at least 30% by weight, preferably at least 35% by weight and more preferably at least 40% by weight of polymer B, based in each case on the overall moulding compound. Since polymers A and B are different, they are generally incompatible with one another. In this case, either the moulding compound has to comprise a compatibilizer, or the two polymers A and B are at least partly joined to one another via chemical reactions.

One example of a moulding compound with compatibilizer is a moulding compound comprising a polyamide such as PA11 or PA12 to an extent of at least 30% by weight, a fluoropolymer such as PVDF to an extent of at least 30% by weight and an effective amount of an acrylate copolymer. Suitable acrylate copolymers are disclosed, for example, in EP 0 673 762 A2. It is possible, for example, for 0.1% to 10% by weight of the acrylate copolymer to be present in the moulding compound; in the production of the moulding compound, it is appropriate to premix the fluoropolymer and the acrylate copolymer in the melt.

One example of a moulding compound with chemical linkage is a moulding compound comprising a polyamide such as PA11 or PA12 to an extent of at least 30% by weight and a semiaromatic polyamide or polyphthalamide (PPA) such as PA6T/6, PA6T/86, PA6T/6I, PA6T/OT or PA6T/12 to an extent of at least 30% by weight. In the case of mixing in the melt, because of the high temperatures, transamidation reactions occur here, giving rise to block copolymers having PA11 or PA12 blocks and PPA blocks. These act as compatibilizers between the two components.

In the second embodiment, the multilayer film in the simplest case consists of two layers. It preferably consists of three layers. It may alternatively consist of four, five or even more layers. There is only an upper limit to the number of layers in that it is impracticable to extrude layers of unlimited thinness. For reasons of practicability, the upper limit is therefore 9 layers and preferably 7 layers.

Examples of Two-Layer Films are:

Layer oriented toward the liner and composed of a moulding compound comprising 50% to 80% by weight of polymer A and 20% to 50% by weight of polymer B, and layer oriented toward the tape and composed of a moulding composition comprising 50% to 80% by weight of polymer B and 20% to 50% by weight of polymer A. The two moulding compounds appropriately also comprise 0.1% to 10% by weight of a compatibilizer. The percentages here, as in the examples which follow, are based on the overall moulding compound.

In the case of a liner having an outer PVDF surface, the layer of the film oriented toward the liner consists of a moulding compound comprising at least 30% by weight of PVDF and 2.5% to 50% by weight of the acrylate copolymer disclosed in EP 0 673762 A2; the layer oriented toward the tape consists of the same polyamide as the matrix of the tape, for example PA11 or PA12, to an extent of at least 50% by weight.

In the case of a liner having an outer PPA surface, the layer of the film oriented toward the liner consists of a moulding compound comprising at least 40% by weight of the same PPA; the layer oriented toward the tape consists of the same polyamide as the matrix of the tape, for example PA11 or PA12, to an extent of at least 50% by weight. Both moulding compounds may additionally comprise 0.1% to 25% by weight of a polyolefinic impact modifier containing acid anhydride groups.

In the case of a liner having an outer PPS surface, the layer of the film oriented toward the liner consists of a moulding compound comprising at least 50% by weight of PPS and 3% to 30% by weight of a polyolefinic impact modifier containing acid anhydride groups that may also contain acrylate units (trade name, for example, LOTADER®); the layer oriented toward the tape consists of the same polyamide as the matrix of the tape, for example PA11 or PA12, to an extent of at least 50% by weight.

In the case of a liner having an outer PA11 or PA12 surface, the layer of the film oriented toward the liner consists of a moulding compound comprising the same polyamide to an extent of at least 40% by weight and 30% to 60% by weight of a polypropylene or polyethylene containing acid anhydride groups; the layer oriented toward the tape consists of the same polypropylene or polyethylene as the matrix of the tape to an extent of at least 50% by weight.

In the case of a liner having an outer PEEK surface, the layer of the film oriented toward the liner consists of a moulding compound comprising PEEK to an extent of at least 30% by weight and a polyimide or polyether imide to an extent of 20% to 70% by weight; the layer oriented toward the tape consists of the same PPA as the matrix of the tape to an extent of at least 50% by weight, where the PPA for this layer preferably has an excess of amino end groups to improve adhesion. The PPA for the tape matrix may differ therefrom in terms of the end group content.

Examples of Three-Layer Films are:

Layer oriented toward the liner and composed of a moulding compound comprising at least 40% by weight of polymer A. This is followed by an adhesion promoter layer composed of a moulding compound comprising at least 30% by weight of polymer A, at least 30% by weight of polymer B, and optionally 0.1% to 20% by weight of compatibilizer. The layer oriented toward the tape comprises polymer B to an extent of at least 40% by weight.

In the case of a liner having an outer PVDF surface, the layer of the film oriented toward the liner consists of a moulding compound comprising at least 30% by weight and preferably at least 50% by weight of PVDF. This is followed by an adhesion promoter layer composed of an acrylate polymer according to EP 0 673 762 A2 or of a polyamide/acrylate copolymer mixture according to EP 0 618 390 A1. The layer oriented toward the tape consists of the same polyamide as the matrix of the tape to an extent of at least 50% by weight; just like the polyamide of the adhesion promoter layer; examples of these are PA11 or PA12.

In the case of a liner having an outer PPA surface, the layer of the film oriented toward the liner consists of a moulding compound comprising at least 40% by weight of the same PPA. This is followed by an adhesion promoter layer composed of a moulding compound comprising at least 30% by weight of this PPA and at least 30% by weight of the polyamide to be bonded thereto. The layer oriented toward the tape consists of the same polyamide as the matrix of the tape to an extent of at least 50% by weight, for example PA11 or PA12.

In the case of a liner having an outer PPS surface, the layer of the film oriented toward the liner consists of a moulding compound comprising PPS to an extent of at least 50% by weight. This is followed by an adhesion promoter layer composed of a moulding compound comprising at least 50% by weight of PPS and 3% to 30% by weight of a polyolefinic impact modifier which contains acid anhydride groups and may also contain acrylate units (trade name, for example, LOTADER®). The layer oriented toward the tape consists of the same polyamide as the matrix of the tape to an extent of at least 50% by weight, for example PA11 or PA12.

In the case of a liner having an outer PA11 or PA12 surface, the layer of the film oriented toward the liner consists of a moulding compound comprising the same polyamide to an extent of at least 40% by weight. This is followed by an adhesion promoter layer composed of an acid anhydride-functionalized polyethylene (if the tape matrix is based on polyethylene) or an acid anhydride-functionalized polypropylene (if the tape matrix is based on polypropylene). The layer oriented toward the tape consists of the same polyethylene or polypropylene as the matrix of the tape to an extent of at least 50% by weight In the case of a liner having an outer PEEK surface, the layer of the film oriented toward the liner consists of a moulding compound comprising PEEK to an extent of at least 40% by weight. This is followed by an adhesion promoter layer composed of a moulding compound comprising at least 50% by weight of a polyimide or polyether imide. The layer oriented toward the tape consists of the same PPA as the matrix of the tape to an extent of at least 50% by weight, where the PPA for this layer preferably contains an excess of amino end groups to improve adhesion. The PPA for the tape matrix may differ therefrom in terms of the end group content.

The percentages by weight in these examples are merely illustrative; they can be varied according to the general figures given in the claims and the description.

Single-layer films are produced in a known manner by extrusion, and multilayer films in a likewise known manner by coextrusion, extrusion coating or lamination.

The film to be applied is generally in the form of a tape. The film tape is wound around the liner in the form of a spiral, the angle being dependent on the tape width and the liner diameter. All that matters is to cover the outer surface of the liner substantially seamlessly and preferably virtually completely seamlessly; the winding angle is unimportant in principle, provided that crease-free winding of this film lamina is possible. Advantageously, the film is wound such that there is neither overlapping nor gaps. However, slight overlaps or gaps may possibly be tolerated. The winding is effected under a contact pressure which is generated by the winding tension or by a pressing apparatus. In order to increase the tensile strength of the film and hence prevent tearing of the softened film in the course of winding, one or more film layer(s) may contain unidirectional reinforcing fibres. In order not to worsen the adhesion of the adjoining layers, however, it is advisable here not to choose too high a fibre content. In general, fibre contents in the range from 3% to 20% by volume are sufficient. A specific embodiment of this is a film composed of three or more layers where the middle layer (in the case of a three-layer film) or at least one of the middle layers (in the case of a film composed of more than three layers) comprises unidirectional reinforcing fibres. In this case, the fibre content may, for example, be in the range from 3% to 40% by volume. The unidirectional reinforcing fibres are generally oriented in axial direction of the film tape. Multilayer films of this kind that comprise a fibre-reinforced layer can be produced, for example, by laminating the individual layers, by extruding unreinforced layers onto a reinforced layer, or by extruding moulding compounds onto a spread fibre lamina, in one possible embodiment, the film provided is bonded directly to the tape of the first tape lamina over an area; in this case, the tape and the side of the film that is rich in polymer B are welded to one another. In this embodiment, step d) is undertaken. One advantage of this embodiment is that the winding tension required cannot lead to breakage of the film, since it is reinforced by the tape. A composite of this kind can be produced, for example, by laminating tape and film.

What is important is that both contact faces are melted in the welding of liner and film. In one embodiment, the two contact faces are melted at the surface, for example by means of infrared radiation, hot air, hot gas, laser radiation, microwave radiation, or directly by contact heating. The contact faces that have been melted at the surface are then pressed against one another, for example with the aid of the winding tension or by means of a contact body, for instance a roller or a jaw. The contact pressure should then be maintained until the molten regions have solidified. In a further embodiment, the film is wound up and then melted from the outside, either indirectly or else directly by means of a heatable contact body. The heating output has to be calibrated such that the outer surface of the liner also starts to melt here. Thereafter, the contact pressure is maintained until the regions melted at the surface have solidified. This process can be conducted with the aid of a winding station and a downstream consolidation station, as described, for example, in WO 2012/118379.

The thickness of the film has to be sufficient to be able to absorb the winding forces. On the other hand, the film has to be sufficiently flexible. The film generally has a thickness in the range from 0.1 to 3 mm, preferably in the range from 0.3 to 2 mm and more preferably in the range from 0.5 to 1.2 mm.

In step d), the tape is applied to the structure thus obtained with application of a contact pressure. As in the case of the film, the necessary contact pressure can be achieved through the winding tension or by means of a contact body. Here too, in one embodiment, the two contact faces are melted at the surface, for example by means of infrared radiation, hot air, hot gas laser radiation, microwave radiation, or directly by contact heating. The party molten contact surfaces are then pressed against one another. The contact pressure should then be maintained until the molten regions have solidified. In a further embodiment, the tape is wound up and then melted from the outside, either indirectly or else directly by means of a heatable contact body. The heating output has to be calibrated such that the outer surface of the previously applied film also starts to melt here. Thereafter, the contact pressure is maintained until the regions melted at the surface have solidified. The winding of the tape and the winding-up of any further tape laminas in step e) is prior art; no exact description of the procedure is therefore necessary. For details, reference is made to the prior art cited in the introductory part of the description.

Any further tape laminas that have been wound up in step e), in a preferred embodiment, have a matrix composed of a moulding compound comprising at least 30% by weight, preferably at least 40% by weight, more preferably at least 50% by weight, even more preferably at least 80% by weight and especially preferably at least 70% by weight, at least 80% by weight or at least 85% by weight of the polymer B, based in each case on the overall moulding compound. In a further embodiment, they have a matrix composed of a moulding compound based on another polymer, provided that the cohesive bond to the previous tape lamina can be assured. For example, adhesion can be generated in the same way as described above by means of a single- or multilayer film of appropriate construction. In the case of these further tape laminas too, the proportion by volume of the reinforcing fibres in the tape is generally 10% to 85%, preferably 15% to 80%, more preferably 20% to 75% and especially preferably 25% to 70%, where the fibres are preferably in the form of a unidirectional fibre lamina.

In order to protect the outer tape lamina, it is optionally possible to finally apply an outer cover lamina of a polymeric material. This is either a thermoplastic moulding compound or a thermoplastic or crosslinkable or crosslinked elastomer. The cover lamina preferably adheres firmly to the outer tape lamina. For this purpose, it is advantageous to choose the material for the cover lamina such that it comprises at least 30% by weight of the same polymer as in the matrix for the outer tape lamina or of a polymer compatible therewith. In this case, the cover lamina may be applied, for example, by means of a crosshead extrusion die and hence be cohesively bonded to the tape lamina. If the cover lamina, however, is based on a polymer which is incompatible with the material for the outer tape lamina, it is possible, in the same way as described above, to generate the adhesion by means of a single- or multilayer film of corresponding makeup. Adhesion can also be generated by crosslinking of a crosslinkable elastomer.

The invention also provides a thermoplastic composite pipe which can be produced using the process according to the invention. It comprises, from the inside outward, the following components:
  a) a tubular liner having a wall comprising a thermoplastic polymer A in the region of the outer surface;
  b) an intermediate lamina which is directly and cohesively bonded to the liner and in which the region of the contact area bonded to the liner consists of a moulding compound comprising polymer A to an extent of at least 30% by weight, preferably to an extent of at least 40% by weight, more preferably to an extent of at least 50% by weight, especially preferably to an extent of at least 60% by weight and most preferably to an extent of at least 70% by weight, and in which the region of the opposite contact area bonded to the subsequent tape lamina consists of a moulding compound comprising a thermoplastic polymer B to an extent of at least 30% by weight, preferably to an extent of at least 40% by weight, more preferably to an extent of at least 50% by weight, especially preferably to an extent of at least 60% by weight and most preferably to an extent of at least 70% by weight;
  c) a tape lamina which is directly and cohesively bonded to the intermediate lamina and comprises reinforcing fibres in a matrix comprising polymer B, d) optionally one or more further tape laminas which comprise reinforcing fibres in a matrix and are each cohesively bonded to the prior tape lamina;

e) optionally an outer cover lamina composed of a polymeric material, where polymer A and polymer B are different.

The individual configurations of this thermoplastic composite pipe will be apparent from the above details relating to the production process.

In the process according to the invention, composite formation between identical polymers in the critical process step achieves better quality of adhesion. In addition, it is possible to use single-layer liner pipes. Existing large pipe extrusion plants can therefore continue to be utilized without modification.

The pipe according to the invention is especially suitable for offshore applications in oil or gas production, for instance for transport of the products to platforms, for connection to steel pipes, as a transport pipe and especially, for example, as an umbilical, as a riser, as a jumper line, as a flowline, as an intervention line, as a downline, as an injection line or as a pressure line. The invention likewise provides for the use for transport of possibly pressurized hydrocarbons or mixtures thereof, such as crude oil, crude gas, triphase (i.e. oil/gas/water mixture), processed oil (already partly processed at the seabed), processed gas, gasoline or diesel, of injection media such as water (for instance to maintain the pressure in the cavern), oilfield chemicals, methanol or $CO_2$, and for conduction of hydraulic oils (for example for actuators at the seabed). Furthermore, the pipe according to the invention is also suitable as a pressure-conducting line in the onshore sector or in other industrial applications, especially in those where relatively high forces have to be transmitted in the axial pipe direction with force-fitting bonding between the pipe and connection element.

The invention claimed is:

1. A process far producing a thermoplastic composite pipe, comprising:
   (i) applying an intermediate lamina to a tubular liner, where the intermediate lamina consists of one, two or three layers, with melting of an outer surface of the liner and of the contact surface of the intermediate lamina either beforehand, simultaneously or thereafter,
   (ii) applying a tape to the outer surface of the intermediate lamina, with melting of an outer surface of the intermediate lamina applied and of the contact surface of the tape either beforehand, simultaneously or thereafter,
   wherein
   the tubular liner comprises a thermoplastic polymer A in the outer surface thereof,
   the tape comprises reinforcing fibres in a matrix comprising a thermoplastic polymer B,
   the polymer A and the polymer B are different,
   only one surface of the intermediate lamina is brought into contact with the liner, wherein the one surface of the intermediate lamina which is brought into contact with the liner consists of a moulding compound comprising at least 30% by weight of the polymer A, and
   the opposite surface of the intermediate lamina consists of a moulding compound comprising at least 30% by weight of the polymer B, and
   the two polymers A and B are at least partly joined to one another via chemical reactions.

2. The process according to claim 1, wherein one or more further tape laminas comprising reinforcing fibres in a matrix are cohesively bonded to the tape applied.

3. The process according to claim 1, further comprising applying an outer cover lamina comprising a polymeric material to the tape.

4. The process according to claim 1, wherein the intermediate lamina consists of two or three layers cohesively bonded to one another.

5. The process according to claim 4, wherein at least one layer of the intermediate lamina comprises unidirectional reinforcing fibres.

6. The process according to claim 1, wherein the polymer A of the liner is selected from the group consisting of polyolefin, polyamide, polyphthalamide, polyethylene naphthalate, polybutylene naphthalate, fluoropolymer, polyphenylene sulphide, polyether sulphone, polyphenyl sulphone and polyarylene ether ketone.

7. The process according to claim 1, wherein the polymer B of the tape is selected from the group consisting of polyolefin, polyamide, polyphthalamide, polyethylene naphthalate, polybutylene naphthalate, fluoropolymer, polyphenylene sulphide, polyether sulphone, polyphenyl sulphone and polyarylene ether ketone.

8. The process according to claim 2, wherein the fibre reinforcement of the one or more tape laminas is in the form of a unidirectional fibre lamina.

9. The process according to claim 1, wherein the fibre content of the tape is 10% to 85% by volume.

10. A thermoplastic composite pipe comprising the following components, from inside outward:
    a) a tubular liner comprising a thermoplastic polymer A at an outer surface of the tubular liner;
    b) an intermediate lamina which is directly and cohesively bonded to the liner;
    c) a tape lamina v which is directly and cohesively bonded to the intermediate lamina and comprises reinforcing fibres in a matrix comprising a thermoplastic polymer B,
    d) optionally one or more further tape laminas which comprise reinforcing fibres in a matrix and are each cohesively bonded to its preceding tape lamina thereof; and
    e) optionally an outer cover lamina comprising a polymeric material,
    wherein
    the intermediate lamina is a mono, double, or triple layer,
    an inner surface of the intermediate lamina bonded to the liner consists of a moulding compound comprising at least 30% by weight of polymer A, and
    an outer surface of the intermediate lamina bonded to the tape lamina consists of a moulding compound comprising at 30% by weight of the thermoplastic polymer B,
    wherein
    polymer A and polymer B are different, and
    the two polymers A and B are at least partly joined to one another via chemical reactions.

11. The thermoplastic composite pipe according to claim 10, wherein
    the intermediate lamina is a double layer, and
    the layer oriented towards the tubular liner is composed of a moulding compound comprising 50% to 80% by weight of polymer A and 20% to 50% by weight of polymer B, and
    the layer oriented towards the tape lamina is composed of a moulding composition comprising 50% to 80% by weight of polymer B and 20% to 50% by weight of polymer A.

12. The thermoplastic composite pipe according to claim 11, wherein the moulding compounds of both layers of the intermediate lamina comprise 0.1% to 10% by weight of a compatibilizer.

13. The thermoplastic composite pipe according to claim 10, wherein
the intermediate lamina is a triple layer, wherein
the layer oriented towards the tubular liner is composed of a moulding compound comprising at least 40% by weight of polymer A,
the middle layer is composed of a moulding compound comprising at least 30% by weight of polymer A and at least 30% by weight of polymer B, and
the layer oriented towards the tape lamina is composed of a moulding composition comprising at least 40% by weight polymer B.

14. The thermoplastic composite pipe according to claim 13, wherein the moulding compound of the middle layer of the intermediate lamina comprises 0.1% to 20% by weight of a compatibilizer.

15. The them plastic composite pipe according to claim 10, wherein the thermoplastic composite pipe is selected from the group consisting of an umbilical, a riser, a jumper line, a flowline, an intervention line, a downline, an injection line, and a pressure line.

16. A process, comprising transporting crude oil, crude gas, triphase, processed oil, processed gas, gasoline, diesel or injection media, or performing conduction of hydraulic oils, with the thermoplastic composite pipe according to claim 10.

\* \* \* \* \*